(12) United States Patent
Itou et al.

(10) Patent No.: US 9,796,275 B2
(45) Date of Patent: Oct. 24, 2017

(54) ELECTRONIC CONTROL DEVICE

(71) Applicant: DENSO CORPORATION, Kariya, Aichi-pref (JP)

(72) Inventors: Akito Itou, Kariya (JP); Junji Sugiura, Hekinan (JP); Hirotsugu Kato, Hekinan (JP)

(73) Assignee: DENSO CORPORATION, Kariya (JP)

( * ) Notice: Subject to any disclaimer, the term of this patent is extended or adjusted under 35 U.S.C. 154(b) by 397 days.

(21) Appl. No.: 14/615,631

(22) Filed: Feb. 6, 2015

(65) Prior Publication Data
US 2015/0239351 A1   Aug. 27, 2015

(30) Foreign Application Priority Data

Feb. 26, 2014   (JP) .................................. 2014-35900

(51) Int. Cl.
*B60R 16/03*   (2006.01)
*F02D 41/06*   (2006.01)
(Continued)

(52) U.S. Cl.
CPC .............. *B60L 11/12* (2013.01); *B60L 3/0084* (2013.01); *B60L 3/12* (2013.01); *B60R 16/03* (2013.01);
(Continued)

(58) Field of Classification Search
CPC .......... B60L 3/0084; B60L 3/12; B60L 11/12; B60R 16/03; F02D 41/062; G06F 1/3203; G06F 1/3206; G06F 1/3209
(Continued)

(56) References Cited

U.S. PATENT DOCUMENTS 6,367,022 B1 *  4/2002  Gillespie .................. G06F 1/26
                                                                  307/31
8,159,184 B2 *  4/2012  Emori .................. B60L 3/0046
                                                                  307/10.1
(Continued)

FOREIGN PATENT DOCUMENTS

JP   2005-297669 A   10/2005
JP   2007-237768 A    9/2007
JP   2013-006482 A    1/2013

OTHER PUBLICATIONS

Office Action dated Feb. 16, 2016 in the corresponding JP application No. 2014-035900 (with English translation).

*Primary Examiner* — Levi Gannon
(74) *Attorney, Agent, or Firm* — Posz Law Group, PLC

(57) ABSTRACT

A vehicular electronic control device activated according to an on-state signal from a main switch and a wake-up signal from an external device includes: a microcomputer; a voltage generating circuit for the microcomputer; a start circuit that generates the operation voltage with the voltage generating circuit when the on-state signal or the wake-up signal input; a printed wiring board; and a transmission wiring pattern that transmits the on-state signal. A first region of the board mounts the microcomputer and the voltage generating circuit, which activate the vehicular electronic control device when the main switch turns on. A second region of the board mounts the start circuit, which activates the vehicular electronic control device according to the wake-up signal. The transmission wiring pattern extends from the first region to reach the second region.

6 Claims, 2 Drawing Sheets

(51) Int. Cl.
*G06F 1/32* (2006.01)
*B60L 11/12* (2006.01)
*B60L 3/00* (2006.01)
*B60L 3/12* (2006.01)

(52) U.S. Cl.
CPC ......... *F02D 41/062* (2013.01); *G06F 1/3209* (2013.01); *Y02T 10/7077* (2013.01)

(58) Field of Classification Search
USPC .................................................. 307/9.1, 10.1
See application file for complete search history.

(56) References Cited

U.S. PATENT DOCUMENTS

| | | | |
|---|---|---|---|
| 8,653,954 B2* | 2/2014 | Patenaude | B60R 25/403 307/10.1 |
| 8,744,658 B1* | 6/2014 | Moretti | B60L 3/0061 180/65.265 |
| 2003/0025594 A1* | 2/2003 | Akiyama | B60R 16/0315 307/1 |
| 2004/0122565 A1 | 6/2004 | Sakurai et al. | |
| 2006/0253718 A1 | 11/2006 | Kawase et al. | |
| 2012/0054526 A1 | 3/2012 | Sugitachi | |
| 2012/0274277 A1 | 11/2012 | Masuda et al. | |
| 2015/0210232 A1* | 7/2015 | Kanzaki | B60R 16/033 701/36 |

* cited by examiner

ELECTRONIC CONTROL DEVICE

CROSS REFERENCE TO RELATED APPLICATION

This application is based on Japanese Patent Application No. 2014-35900 filed on Feb. 26, 2014, the disclosure of which is incorporated herein by reference.

TECHNICAL FIELD

The present disclosure relates to an electronic control device that is activated when a main switch of a vehicle is in an on state, and is activated when a wake-up signal is input from an external device under a condition that the main switch is in an off state.

BACKGROUND

Recently, a hybrid vehicle having a plug-in function for charging a high voltage battery with an external battery charging facility, and a vehicle having a preliminary air conditioning function for air-conditioning a compartment of the vehicle before a user gets in the vehicle, have been developed. When the vehicle has the plug-in function and the preliminary air-conditioning function, it is necessary to activate an electronic control device for executing a certain function under a condition that a main switch of the vehicle such as an ignition switch is in an off state.

For example, when the high voltage battery is charged using the plug-in function, a plug-in hybrid electronic control device (i.e., PHV-ECU) is activated according to a wake-up signal from an external battery charging facility. Specifically, when the external battery charging facility charges the high voltage battery, a charging plug of the external battery charging facility is connected to a charging inlet of the hybrid vehicle. A microcomputer of the PHV-ECU performs a wake-up operation according to a wake-up signal as a pilot signal output from the charging plug. Thus, the PHV-ECU is activated. The activated PHV-ECU converts the alternating current supplied from the external battery charging facility to the direct current, and supplies the direct current to the high voltage battery. Thus, the high voltage battery is charged. In this case, the PHV-ECU outputs the wake-up signal to the range electronic control device (range-ECU) to activate the range-ECU. The range-ECU drives and controls the range switching system, which is arranged in an automatic transmission, using an electric motor. During the charging operation, in order to prevent the vehicle from erroneously moving, the PHV-ECU instructs the range-ECU not to change from a parking range to other ranges even if a start switch operation is performed.

When the preliminary air-conditioning function is to be executed, for example, an electronic control device (i.e., electronic control unit or ECU) determines according to an instruction from a user or a timer operation that it is necessary to start operating the air-conditioning system. In this case, the ECU outputs the wake-up signal to the air-conditioning electronic control device (i.e., air-conditioning ECU) so that the air-conditioning ECU is activated. Thus, the air-conditioning ECU starts to execute the air-conditioning operation in a compartment of the vehicle so as to control the temperature of the compartment to be a set temperature before the user gets on the vehicle.

Thus, even when the main switch is in the off state, a method for activating the electronic control device with the wake-up signal from an external device even when the main switch is in the off state, is disclosed in JP-2004-197585-A (corresponding to US 2004/0122565 A1). The ECU in JP-2004-197585-A controls a power source circuit, for generating a voltage to operate a microcomputer, to transit from an inactive state to an active state according to the wake-up signal. Thus, a stand-by current or a waiting current, which is consumption current when the electronic control device is in a sleep mode so that the ECU stands by a wake-up signal, is reduced.

The hybrid vehicle having the plug-in function and the vehicle having the preliminary air-conditioning function do not grow popular sufficiently. Many vehicles do not have such functions. Accordingly, it is necessary to independently prepare both the electronic control device capable of being activated in order to execute the plug-in function and the preliminary air-conditioning function even when the main switch is in the off state and the electronic control device capable of being activated only when the main switch is in the on state.

In the above case, to prepare two types of the electronic control devices, when a printed wiring board having a circuit board, on which various electronic control elements and circuits are mounted, is independently developed, a development cost of both electronic control devices increases.

When two types of the electronic control devices are compared with each other, a part of the electronic control devices for executing a function when the main switch is in the on state is common. Accordingly, it may be possible to commonly use the part as a circuit board of each electronic control device. If the circuit board of electronic control devices is commonly used, the development cost of both electronic control devices is much reduced. Thus, the manufacturing cost of each electronic control device is also reduced.

SUMMARY

It is an object of the present disclosure to provide a vehicular electronic control device being activated according to an on signal of a main switch and a wake-up signal of an external device and having a circuit board, which is easily diverted to a circuit board of another electronic control device being activated only when the main switch turns on.

According to an example aspect of the present disclosure, a vehicular electronic control device, which is activated when a main switch of a vehicle turns on, and is activated according to a wake-up signal from an external device when the main switch is in an off state, the vehicular electronic control device includes: a microcomputer; a voltage generating circuit that generates an operation voltage for operating the microcomputer; a start circuit that starts controlling the voltage generating circuit to generate the operation voltage when an on-state signal of the main switch or the wake-up signal of the external device is input; a printed wiring board that mounts the microcomputer, the voltage generating circuit, and the start circuit; and a transmission wiring pattern that transmits an on-state signal of the main switch, and is arranged on the printed wiring board. The printed wiring board has a rectangular shape, which includes a first region and a second region. The first region mounts the microcomputer and the voltage generating circuit, which activate the vehicular electronic control device when the main switch turns on. The second region mounts the start circuit, which activates the vehicular electronic control device according to the wake-up signal, and the transmission wiring pattern extends from the first region to reach the second region.

In the first region, the microcomputer and the voltage generating circuit are mounted. The microcomputer and the voltage generating circuit are necessary for activating the vehicular electronic control device when the main switch turns on. In the second region, the start circuit is mounted. the start circuit is necessary for activating the vehicular electronic control device according to the wake-up signal. Thus, the first region substantially corresponds to a circuit board of the vehicular electronic control device, which is activated only when the main switch turns on.

Here, in the vehicular electronic control device, which is activated only when the main switch turns on, it is necessary to start generating the operation voltage of the voltage generating circuit based on the on state signal of the main switch. In the above vehicular electronic control device, the transmission wiring pattern extends from the first region and reaches the second region. Accordingly, it is easy to connect the transmission wiring pattern and the voltage generating circuit so that the voltage generating circuit starts generating the operation voltage based on the on state signal of the main switch.

Thus, it is easy to divert the above vehicular electronic control device to the vehicular electronic control device, which is activated only when the main switch turns on.

When the above vehicular electronic control device to the vehicular electronic control device, which is activated only when the main switch turns on, the second region may be removed from the first region. Alternatively, the second region may be remained without mounting electric circuits and electric elements. Alternatively, the second region may be remained without mounting electric circuits and electric elements and forming wiring patterns.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

A vehicular electronic control device according to an example embodiment includes a circuit board, which is activated not only when a main switch of a vehicle such as an ignition switch is in an on state but also when a wake-up signal from an external device is input under a condition that the main switch is in the off state. The circuit board of the vehicular electronic control device according to the present embodiment is easily diverted to a circuit board of another electronic control device being activated only when the main switch is in the on state.

Accordingly, when the vehicular electronic control device according to the present embodiment is applied to a plug-in hybrid ECU, a hybrid ECU without a plug-in function, a range-ECU, or an air-conditioning ECU, it is not necessary to develop a circuit board in a case where the ECU has the plug-in function and/or the preliminary air-conditioning function independently from a case where the ECU does not has the plug-in function and the preliminary air-conditioning function. Thus, the development cost of each electronic control device is much reduced, and therefore, the manufacturing cost of each electronic control device is also reduced.

Figure 1:
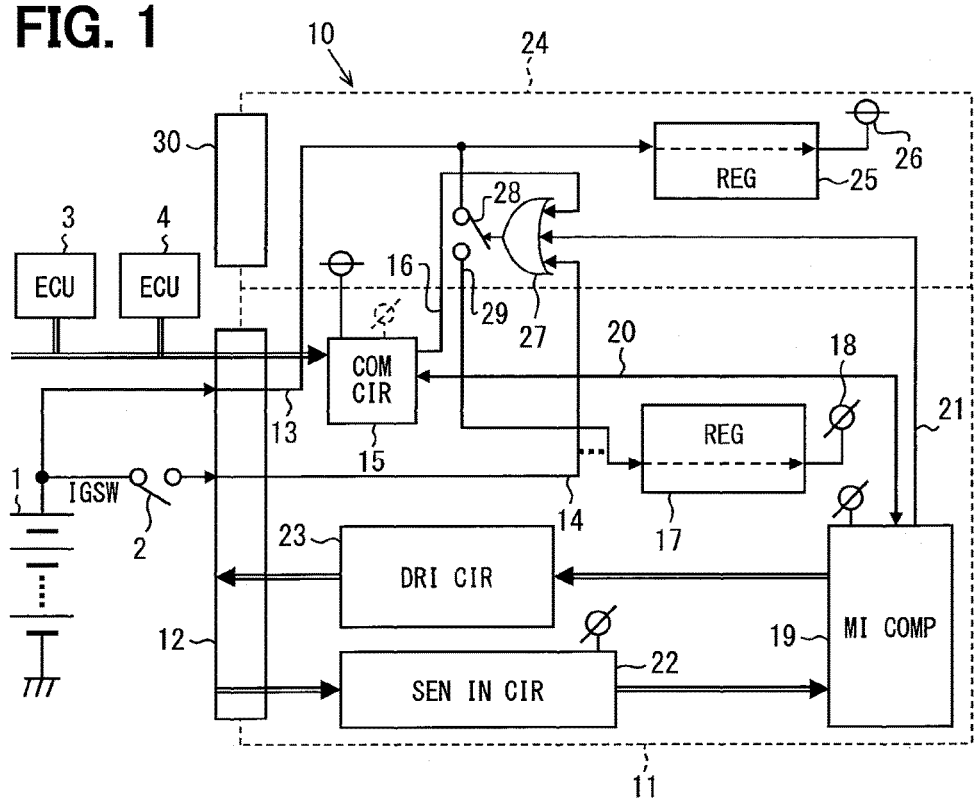
FIG. 1 is a diagram showing a circuit board of a vehicular electronic control device according to an example embodiment.

A vehicular electronic control device according to an example embodiment of the present disclosure will be explained with reference to drawings. FIG. 1 shows a circuit board of the vehicular electronic control device 10 according to the present embodiment.

As shown in FIG. 1, various circuits and electric elements such as a communication circuit 15, a regulator 17, 25 as a voltage generating circuit, and a microcomputer 19 are mounted on a printed circuit board having a rectangular shape. Thus, a circuit board of the vehicular electronic control device 10 is prepared. The printed wiring board as the circuit board of the device 10 is divided into two parts, i.e., the first region 11 and the second region 24. Various circuits including the microcomputer 19 and the regulator 17 are mounted in the first region 11, and the various circuits are necessary for functioning the device 10 when the main switch 2 turns on. Other various circuits including a start circuit are mounted in the second region 24, and the start circuit is necessary for activating the device 10 according to the wake-up signal from the ECU 3, 4 as the external device. The first region 11 and the second region 24 have a rectangular shape, respectively. Accordingly, when the circuit board of the vehicular electronic control device 10 according to the present embodiment is utilized as a circuit board of another electronic control device that is activated only when the main switch is in the on state, a part of the circuit board corresponding to the first region 11, from which other parts of the circuit board corresponding to the second region 24 is removed, is utilized. Even in this case, the shape of the part of the circuit board is the rectangular.

The circuit construction of the first region 11 and the circuit construction of the second region 24 will be explained as follows.

A connector 12 is arranged in the first region 11. The connector 12 is connected to a wiring extending from a vehicular battery 1 as a first power source line. The first power source line is connected to a wiring pattern 13 via the connector 12. The wiring pattern 13 extends from the first region 11 to the second region 24. The wiring pattern 13 is connected to the switch 28, which provides a regulator 25 and the start circuit. Accordingly, the battery voltage is always supplied to the regulator 25 and the switch 28 regardless of the on and off states of the main switch 2.

Further, the connector 12 is connected to a wiring as a second power source line via the main switch 2 from the vehicular battery 1. The second power source line is connected to the wiring pattern 14 via the connector 12. The wiring pattern 14 reaches the second region 24 from the first region 11. The wiring pattern 14 is formed to be arranged in the first region 11 near the wiring pattern 29, which supplies the battery voltage to the regulator 17. Accordingly, when the circuit board of the vehicular electronic control device 10 according to the present embodiment is diverted to a circuit board of a vehicular electronic control device that is activated only when the main switch 2 turns on, a jumper resistor 31 having zero Ohm (i.e., 0Ω) is used so that the wiring pattern 14 and the wiring pattern 29 are connected to each other easily.

In the second region 24, the wiring pattern 14 is connected to an input terminal of the OR circuit 27, which provides the start circuit. Accordingly, when the main switch 2 turns on, the battery voltage signal as the on state signal is input into the OR circuit 27.

As shown in FIG. 1, the vehicular electronic control device 10 according to the present embodiment communicates with ECUs 3, 4 as an external device via a local area network arranged in the vehicle. The communication between the ECUs 3, 4 and the device 10 is performed through the communication circuit 15 mounted in the first region 11. When the main switch 2 is in the off state, the ECUs 3, 4 output the wake-up signal toward the device 10.

The regulator 25 mounted in the second region 24 decreases the battery voltage, and generates the operation voltage 26, which is necessary for operating the communication circuit 15 in the first region 11. The operation voltage 26 is supplied to the communication circuit 15, so that the communication circuit 15 is capable of always receiving the wake-up signal from the ECUs 3, 4 regardless of the on and off state of the main switch 2. When the communication circuit 15 receives the wake-up signal, the circuit 15 outputs the reception signal to the wiring pattern 16 according to the wake-up signal. The wiring pattern 16 extends from the first region 11 to the second region 24. Then, the wiring pattern 16 is connected to the input terminal of the OR circuit 27. Accordingly, the reception signal indicative of reception of the wake-up signal output from the communication circuit 15 is input into the OR circuit 27.

When at least one of the battery voltage signal and the reception signal showing reception of the wake-up signal is input into the OR circuit 27, the circuit 27 outputs a driving signal for closing the switch 28. A downstream side of the switch 28 is connected to the power source terminal of the regulator 17 via the wiring pattern 29. Accordingly, when the switch 28 is closed, i.e., when the switch 28 turns on, the battery voltage is supplied to the regulator 17 in the first region 11 via the switch 28 and the wiring pattern 29.

The regulator 17 decreases the battery voltage, and generates the operation voltage 18, which is necessary for operating various circuits such as the microcomputer 19 and the sensor input and output circuit 22 mounted in the first region 11. The driving circuit 23 drives a control object device of the electronic control device 10. The control object device is, for example, an electric motor for driving a range switching system. In some cases where the load current of the control object device has a certain magnitude, the battery voltage may be supplied as the operation voltage of the driving circuit 23 instead of the operation voltage 18 generated by the regulator 17.

When the regulator 17 generates the operation voltage 18, the microcomputer 19 and the input circuit 22 are operable. Then, the microcomputer 19 starts to execute the control process, which is necessary for a case where the microcomputer 19 is woken up by the other ECU 3, 4. For example, the vehicular electronic control device 10 according to the present embodiment is applied to the range shift ECU, the microcomputer 19 detects the current range of the automatic transmission using the sensor input circuit 22. When the current range is the parking range, and the microcomputer 19 receives the instruction, for prohibiting the switching operation from the parking range to other ranges, from the ECU 3, 4 via the communication circuit 15 and the wiring pattern 20, the microcomputer 19 does not output the driving signal via the driving circuit 23 to the electric motor for driving the range switching system even if the start switch operation is detected.

Further, the microcomputer 19 starts to function when the operation voltage 18 is supplied to the microcomputer 19 from the regulator 17. In this case, the microcomputer 19 outputs the maintaining signal for maintaining the close state of the switch 28 via the wiring pattern 21. The wiring pattern 21 is connected to the input terminal of the OR circuit 27. Accordingly, while the microcomputer 19 outputs the maintaining signal, the switch 28 maintains the close state. Accordingly, after the ECU 3, 4 stops outputting the wake-up signal, the microcomputer 19 is capable of continuously receiving the operation voltage 18 from the regulator 17. When the microcomputer 19 receives an operation stop signal for stopping the operation from the ECU 3, 4, the microcomputer 19 stops outputting the maintaining signal. Thus, the switch 28 turns off, i.e., the switch switches from the close state to the open state. Accordingly, the regulator 17 stops supplying the operation voltage 18, so that the microcomputer 19 stops functioning.

Here, the connector 30 is utilized when it is required to connect a circuit mounted in the second region 24 with an external device.

Figure 2:
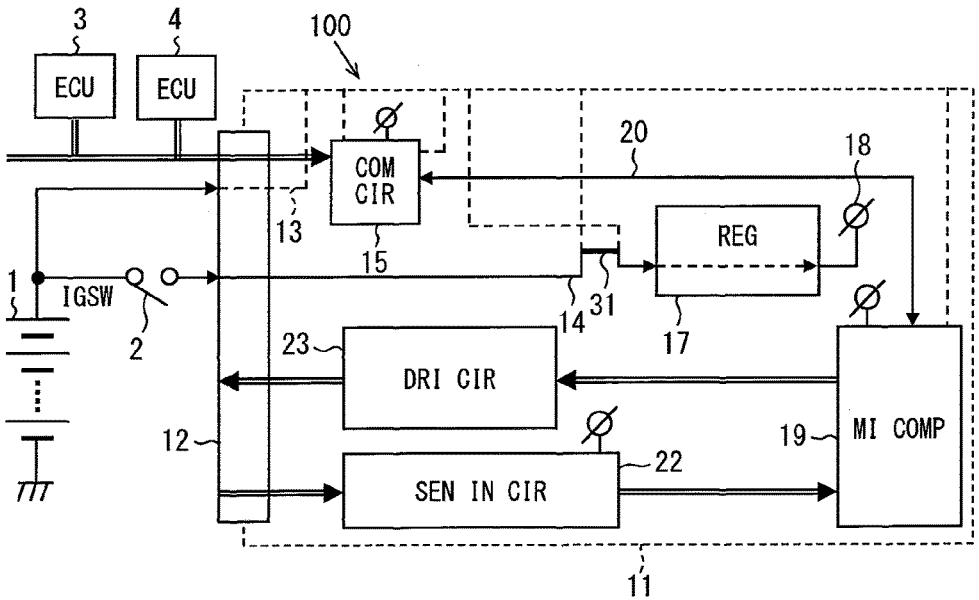
FIG. 2 is a diagram showing a circuit board of a vehicular electronic control device, which is prepared by diverting the circuit board in FIG. 1 to the vehicular electronic control device being activated only when the main switch is in the on state.

Next, a case, where a circuit board having the above described structure is diverted to a circuit board of the electronic control device that is activated only when the main switch is in the on state, will be explained as follows. FIG. 2 shows a circuit board of the vehicular electronic control device 100 that is activated only when the main switch is in the on state, and the circuit board is provided by the circuit shown in FIG. 1.

As shown in FIG. 2, the circuit board of the vehicular electronic control device 100 almost corresponds to a part of the circuit board in FIG. 1 corresponding to the first region. Accordingly, the wiring pattern of the printed wiring board for providing the vehicular electronic control device 10 in FIG. 1 is almost utilized without change. Further, various circuits and electronic elements are mounted on the printed wiring board, so that the circuit board of the vehicular electronic control device 100 is obtained.

Here, it is necessary to consider the following two points when the circuit board is diverted. First, when at least one of the battery voltage signal caused when the main switch 2 turns on and the wake-up signal transmitted from the ECU 3, 4 is generated, in the vehicular electronic control device 10 shown in FIG. 1, the switch 28 is closed, and the battery voltage is supplied to the regulator 17. In the vehicular electronic control device 100 shown in FIG. 2, it is not necessary to activate the device 100 according to the wake-up signal. Accordingly, it is preferable not to use the start circuit including the OR circuit 27 and the switch 28 in order to simplify the circuit construction.

In order to supply the battery voltage to the regulator 17 without the start circuit when the main switch 2 turns on, in the device 100 in FIG. 2, the wiring pattern 14 and a wiring pattern connected to the power source terminal of the regulator 17 are connected to each other via a jumper resistor 31 having a resistance substantially equal to zero Ohm. Thus, using the jumper resistor 31, it is not necessary to change the wiring pattern itself of the circuit board. When the jumper resistor 31 is connected to the wiring patterns, the battery voltage is supplied to the regulator 17 when the main switch 2 turns on.

Second, in the device shown in FIG. 1, the regulator 25 mounted in the second region 24 supplies the operation voltage 26 to the communication circuit 15 in order to receive the wake-up signal from the ECU 3, 4 even when the main switch 2 is in the off state. In the device 100 in FIG. 2, it is not necessary to receive the wake-up signal. Thus, the communication circuit 15 is merely supplied the operation voltage 18 from the regulator 17 when the main switch 2 turns on. Accordingly, in the device 100 in FIG. 2, the regulator 17 supplies the operation voltage 18 to the communication circuit 15.

Figure 3:
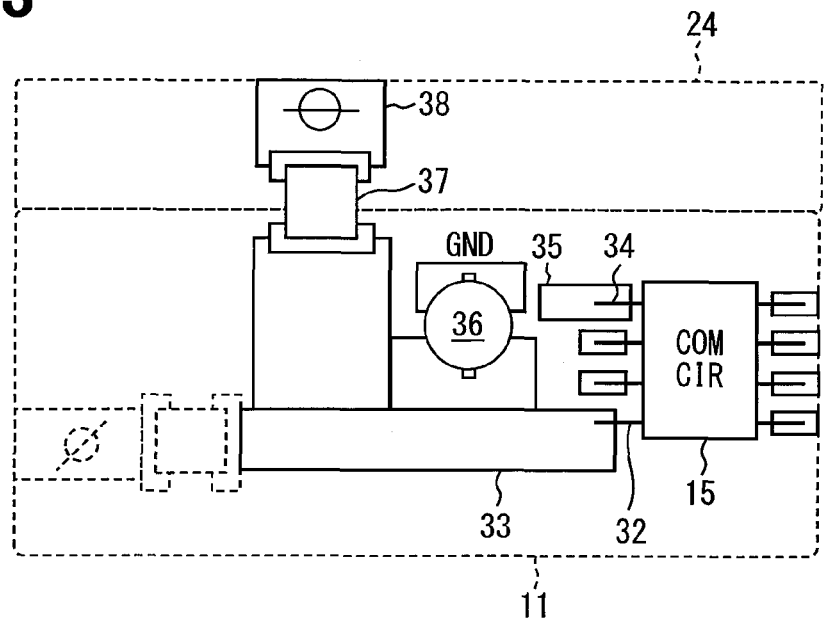
FIG. 3 is a diagram showing a circuit construction when a regulator mounted in a second region supplies an operation voltage to a communication circuit.
Figure 4:
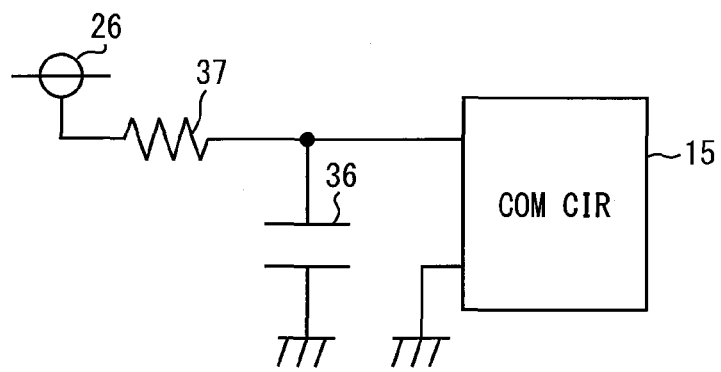
FIG. 4 is a circuit diagram showing an equivalent circuit of a circuit construction in FIG. 3.
Figure 5:
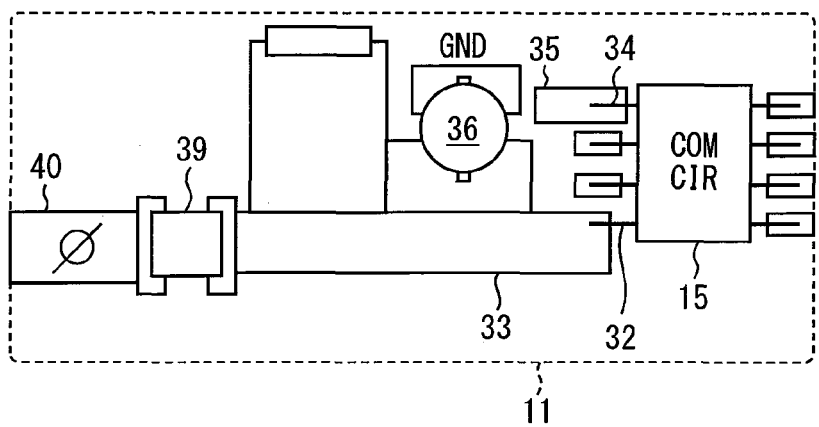
FIG. 5 is a diagram showing a circuit construction when a regulator mounted in a first region supplies an operation voltage to a communication circuit.

A switching method of a power source will be explained with reference to FIGS. 3 to 5. FIG. 3 shows a circuit diagram in a case where the regulator 25 mounted in the second region 24 supplies the operation voltage 26 to the communication circuit 15. FIG. 4 shows an equivalent circuit of the circuit diagram in FIG. 3. FIG. 5 shows a circuit diagram in a case where the regulator 17 mounted in the first region 11 supplies the operation voltage 18 to the communication circuit 15.

As shown in FIG. 3, the wiring pattern 33 connected to the power source terminal 32 of the communication circuit 15 extends to a periphery of the first region 11. The wiring pattern 38 for supplying the operation voltage 26, which is generated by the regulator 25, extends to a periphery of the second region 24 so as to face the wiring pattern 33, which extends to the periphery of the first region 11, with a predetermined distance between the wiring patterns 38, 33. The wiring pattern 33 connected to the power source terminal 32 of the communication circuit 15 and the wiring pattern 38 for supplying the operation voltage 26, which is generated by the regulator 25, are connected to each other via a filter resistor 37 having a predetermined resistance. Thus, the operation voltage generated by the regulator 25 is supplied to the communication circuit 15.

In the first region 11, the wiring pattern 33 between the filter resistor 37 and the power source terminal 32 of the communication circuit 15 is connected to a ground pattern having a ground potential via a capacitor 36. A ground terminal 34 of the communication circuit 15 is connected to the ground pattern 35, which is arranged on a mounting surface of the printed wiring board.

Accordingly, the equivalent circuit relating to the circuit diagram for supplying the operation voltage of the communication circuit 15 and for grounding is shown as FIG. 4. As shown in FIG. 4, a low pass filter is formed with the filter resistor 37 for connecting between the wiring patterns 38, 33. The low pass filter is arranged in a line, through which the operation voltage is supplied. Accordingly, even if a noise is generated at the power source terminal 32 since an electric power consumption of the communication circuit 15 is rapidly changed, for example, the influence of the noise to other circuits is restricted.

As shown in FIG. 5, when the communication circuit 15 receives the supply of the operation voltage 18 from the regulator 17 mounted in the first region 11, the wiring pattern 33 connected to the power source terminal 32 of the communication circuit 15 is connected to the wiring pattern 40, for supplying the operation voltage 18 from the regulator 17 mounted in the first region 11, via the filter resistor 39. Specifically, as shown in FIG. 3, the first region 11 includes an area for connecting a part of the wiring pattern 33, which is connected to the power source terminal 32 of the communication circuit 15 and is arranged further from the communication circuit 15 than the capacitor 36, to the wiring pattern 40, for supplying the operation voltage 18 from the regulator 17, through the filter resistor 39.

In the above case, the filter resistor 39 and the capacitor 36 forms a low pass filter in a line for supplying the operation voltage to the communication circuit 15. Thus, even when the operation voltage 18 is supplied from the regulator 17 and even when the operation voltage 26 is supplied from the regulator 25, a common capacitor 36 provides the low pass filter. Thus, even when a power source of the operation voltage is changed or switched, the capacitor for forming the low pass filter is not changed. Further, the capacitor 36 is disposed at a periphery of the first region 11, as shown in FIGS. 3 and 5. Accordingly, the influence of an external noise is restricted by the capacitor 36.

In the above embodiment, when the circuit board of the vehicular electronic control device 10 in FIG. 1 is diverted to the circuit board of the vehicular electronic control device 100 in FIG. 2, a part of the circuit board corresponding to the second region is removed and only a remaining part corresponding to the first region is used as the circuit board. Alternatively, the part of the circuit board corresponding to the second region may not be removed without mounting electronic elements and circuits on the part, and the part corresponding to the first region may be used as the circuit board together with the part corresponding to the second region. In this case, a wiring pattern may not be formed in the second region 24.

When the circuit board of the vehicular electronic control device 100 in FIG. 2 is prepared, a wiring pattern shown as a dotted line may be removed or remained. Similarly, when the circuit board of the vehicular electronic control device 10 in FIG. 1 is prepared, a wiring pattern 40 shown as a dotted line for supplying the operation voltage 18 from the regulator 17 may not be formed or may be formed. When the wiring pattern 40 is formed without connecting via the filter resistor 37, the power source of the operation voltage is easily changed.

Further, when the regulator 17 includes an enable terminal, a wiring from the switch 28 and a wiring from the main switch 2 may be connected to the enable terminal.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicular electronic control device, which is activated when a main switch of a vehicle turns on, and is activated according to a wake-up signal from an external device when the main switch is in an off state, the vehicular electronic control device comprising:
    a microcomputer;
    a voltage generating circuit that generates an operation voltage for operating the microcomputer;
    a start circuit that starts controlling the voltage generating circuit to generate the operation voltage when an on-state signal of the main switch or the wake-up signal of the external device is input;
    a printed wiring board that mounts the microcomputer, the voltage generating circuit, and the start circuit; and
    a transmission wiring pattern that transmits the on-state signal of the main switch, and is arranged on the printed wiring board,
    wherein the printed wiring board has a rectangular shape, which includes a first region and a second region, wherein the first region mounts the microcomputer and the voltage generating circuit, which activate the vehicular electronic control device when the main switch turns on, wherein the second region mounts the start circuit, which activates the vehicular electronic control device according to the wake-up signal, wherein the transmission wiring pattern extends from the first region to reach the second region, wherein the start circuit includes a switch that is arranged in a connection wiring pattern for connecting between a vehicular battery and a power source terminal of the voltage generating circuit, wherein the start circuit controls the switch to turn on when the on-state signal or the wake-up signal is input, wherein the transmission wiring pattern has an end, which is retrieved from the printed wiring board to be connected to the vehicular battery via the main switch, and wherein the transmission wiring pattern is arranged to pass close to the connection wiring pattern to be connectable with a jumper element in the first region.

2. The vehicular electronic control device according to claim 1, wherein the first region has a rectangular shape, and the second region has another rectangular shape.

3. A vehicular electronic control device, which is activated when a main switch of a vehicle turns on, and is activated according to a wake-up signal from an external device when the main switch is in an off state, the vehicular electronic control device comprising:

a microcomputer;

a voltage generating circuit that generates an operation voltage for operating the microcomputer;

a start circuit that starts controlling the voltage generating circuit to generate the operation voltage when an on-state signal of the main switch or the wake-up signal of the external device is input;

a printed wiring board that mounts the microcomputer, the voltage generating circuit, and the start circuit; and a transmission wiring pattern that transmits the on-state signal of the main switch, and is arranged on the printed wiring board, wherein the printed wiring board has a rectangular shape, which includes a first region and a second region, wherein the first region mounts the microcomputer and the voltage generating circuit, which activate the vehicular electronic control device when the main switch turns on, wherein the second region mounts the start circuit, which activates the vehicular electronic control device according to the wake-up signal, wherein the transmission wiring pattern extends from the first region to reach the second region, wherein the vehicular electronic control device further comprises:

a second region voltage generating circuit that is mounted in the second region, and always generates the operation voltage independently of the off state and an on state of the main switch; and a communication circuit that is mounted in the first region, and communicates with the external device for outputting the wake-up signal, wherein the communication circuit includes a power source terminal, which is connected to the second region voltage generating circuit, and wherein the communication circuit receives the operation voltage from the second region voltage generating circuit.

4. The vehicular electronic control device according to claim 3, further comprising:

a power source wiring pattern that is connected to the power source terminal of the communication circuit; and a second region wiring pattern that is connected to the second region voltage generating circuit, wherein the power source wiring pattern extends from the power source terminal to reach a periphery of the first region, wherein the second region wiring pattern extends from the second region voltage generating circuit to reach a periphery of the second region, wherein the power source wiring pattern faces the second region wiring pattern with a predetermined distance between the power source wiring pattern and the second region wiring pattern, and wherein the power source wiring pattern and the second region wiring pattern are connected to each other via a filter resistor.

5. The vehicular electronic control device according to claim 4, wherein the power source wiring pattern connects the filter resistor and the power source terminal of the communication circuit, and wherein the power source wiring pattern is connected to a ground via a capacitor in the first region.

6. The vehicular electronic control device according to claim 5, wherein the first region includes an area, wherein a part of the power source wiring pattern is connected to a wiring pattern, which extends from the voltage generating circuit, via another filter resistor, wherein the part of the power source wiring pattern is disposed further from the communication circuit than the capacitor.

* * * * *